United States Patent [19]

Arai et al.

[11] 3,939,470

[45] Feb. 17, 1976

[54] LIQUID LEVEL DETECTING AND INDICATING SYSTEM FOR VEHICLE

[75] Inventors: Hiroshi Arai; Jun Ohta, both of Toyota; Koichi Taniguchi; Yasuhiko Sakurai, both of Kariya; Toshikazu Ohtake, Okazaki, all of Japan

[73] Assignees: Nippondenso Co., Ltd., Kariya; Toyota Jidosha Kogyo Kabushiki Kaisha, Toyota, both of Japan

[22] Filed: Feb. 5, 1974

[21] Appl. No.: 439,770

[30] Foreign Application Priority Data

Feb. 8, 1973  Japan.............................. 48-15879

[52] U.S. Cl................ 340/59; 340/244 C; 200/187; 200/190
[51] Int. Cl.²........................................ G08B 21/00
[58] Field of Search.............. 340/59, 244 R, 244 C; 323/69; 200/61.04, 61.05, 184, 185, 187, 188, 190

[56] References Cited

UNITED STATES PATENTS

| | | | |
|---|---|---|---|
| 2,965,888 | 12/1960 | Johnson et al..................... | 323/69 X |
| 2,982,908 | 5/1961 | Erickson et al....................... | 323/69 |

*Primary Examiner*—Alvin H. Waring
*Attorney, Agent, or Firm*—Cushman, Darby & Cushman

[57] ABSTRACT

An improved liquid level detecting and indicating system for vehicles comprising a pair of liquid level detecting elements which are arranged in opposite positions on the detecting level of a liquid in a liquid container installed in a vehicle, whereby when each of the liquid level detecting elements sends a signal indicating that the liquid level has dropped below a reference liquid level, an indicator is brought into operation. In this way, the level of liquid can be accurately detected and indicated without being influenced by the inclination or vibration of a vehicle body.

7 Claims, 5 Drawing Figures

3,939,470

LIQUID LEVEL DETECTING AND INDICATING SYSTEM FOR VEHICLE

The present invention relates to a liquid level detecting and indicating system for vehicles which is capable of accurately detecting and indicating the level of liquid, e.g., engine oil in a vehicle.

Liquid level detecting systems for detecting the liquid level of for example vehicle engine oil have been proposed in the art wherein the self-heating property of an element such as thermistor whose resistance value varies with temperature is utilized. A disadvantage of such system is that a vehicle running on a road is always subject to inclination or vibration depending on the road surfaces and therefore the conventional system employing a single thermal variable resistance element is subject to frequent misoperation due to the inclination or vibration of the vehicle body.

With a view to overcoming the foregoing difficulty, it is an object of the present invention to provide a liquid level detecting and indicating system for vehicles comprising a pair of liquid level detecting elements (e.g., posistors i.e. positive temperature coefficient transistors, thermistors or reed switches actuated by magnet floats) which are arranged in opposite positions on the detecting level of a liquid in a liquid container of the vehicle, whereby when each of the liquid level detecting elements sends a signal indicating that the liquid level in the liquid container has dropped below the detecting liquid level, an indicator is brought into operation, thereby accurately detecting and indicating the liquid level without being affected by for example the inclination or vibration of the vehicle body.

The system according to this invention has among its remarkable advantages the fact that by virtue of the use of a pair of liquid level detecting elements which are arranged in opposite positions on the detecting level of a liquid in a vehicle liquid container so that an indicator is actuated when each of the two liquid level detecting elements produces a signal indicating that the liquid level in the liquid container has dropped below the detecting liquid level, the liquid level can be accurately detected and indicated without being affected by the inclination or vibration of the vehicle body.

Another remarkable advantage of the system of this invention is the fact that each of the liquid level detecting elements comprises a thermal variable resistance element, a discriminating circuit for discriminating the resistance level of each thermal variable resistance element comprises a Schmitt trigger circuit whose input terminal is connected through a diode to the junction point of the thermal variable resistance element and a resistor connected in series therewith, and a resistor is connected between a power supply and the emitters of the transistors in the Schmitt trigger circuit so that the transition points of the Schmitt trigger circuit are set by a bridge circuit, whereby to minimize the effects due to temperature and variation of the power supply voltage.

Other objects, features and advantages of this invention will become readily apparent from the following detailed description taken in conjunction with the accompanying drawings, in which.

The present invention will now be described in greater detail with reference to the illustrated embodiments.

Figure 1:
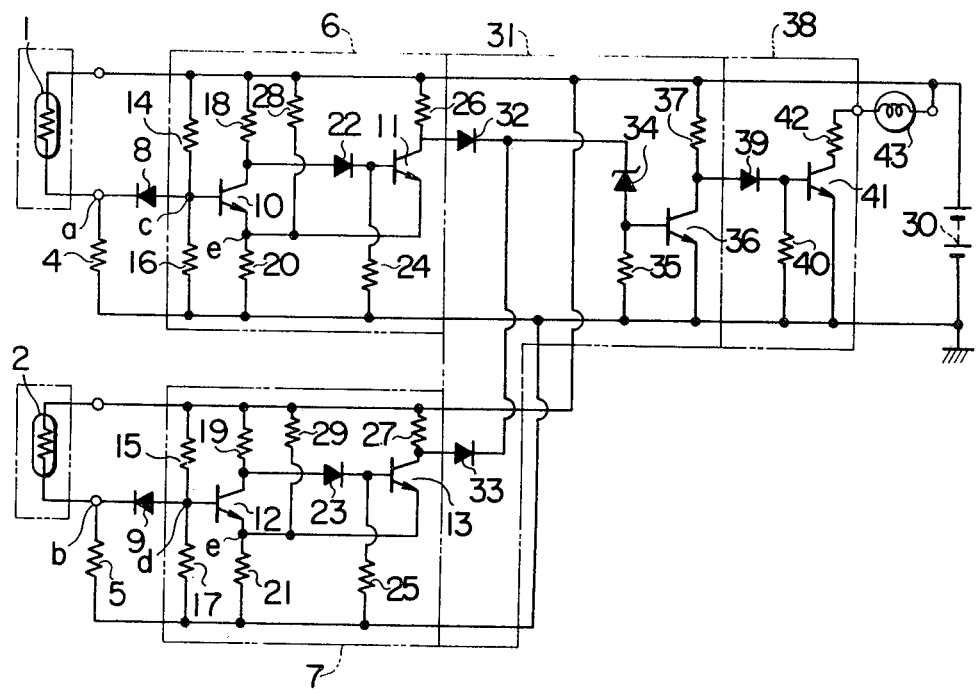
FIG. 1 is a wiring diagram showing an embodiment of a liquid level detecting and indicating system according to the present invention.
Figure 2:
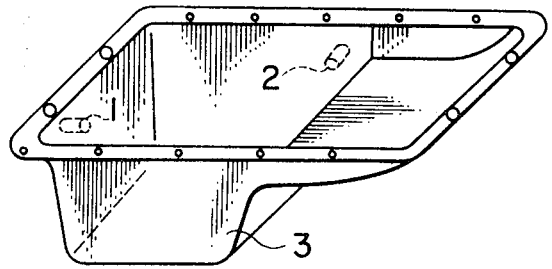
FIG. 2 is a perspective view of a liquid container for explaining the positions where the thermal variable resistance elements are mounted on the liquid container.

Referring first to FIGS. 1 and 2, numerals 1 and 2 designate thermal variable resistance elements for detecting liquid level, e.g., posistors (positive temperature coefficient transistors) having a positive resistance-temperature characteristic. As shown in FIG. 2, the two thermal variable resistance elements 1 and 2 are arranged in opposite positions on the detecting liquid level in a liquid container 3, e.g., oil pan installed in a vehicle. In the exemplary arrangement shown in FIG. 2, the thermal variable resistance element 1 is mounted on the left front portion of the liquid container 3 and the thermal variable resistance element 2 is mounted on the right rear portion of the liquid container 3 so that they are arranged in opposite positions on the detecting level of a liquid and along a straight line inclined relative to the direction of movement of the vehicle. However, it is possible to mount the thermal variable resistance element 1 on the right front portion of the liquid container 3 and the thermal variable resistance element 2 on the left rear portion of the liquid container 3 so that the elements 1 and 2 are arranged in opposite positions along a diagonal line on the plane of the detecting liquid level. Numerals 4 and 5 designate resistors connected respectively in series with the thermal variable resistance elements 1 and 2, 6 and 7 discrimination circuits for respectively discriminating the resistance level of the thermal variable resistance elements 1 and 2 each of which comprises a Schmitt trigger circuit employing transistors. Numerals 8 and 9 designate diodes respectively connected between the respective junction points a and b of the thermal variable resistance elements 1 and 2 and their series resistors 4 and 5 and input terminals c and d of the discrimination circuits 6 and 7, whereby to effect the level shifting of the potentials at the input terminals c and d of the Schmitt trigger circuits 6 and 7 to the potentials at the respective output terminals a and b of the thermal variable resistance elements 1 and 2 and to prevent the passage of the current from the thermal variable resistance elements 1 and 2 into the Schmitt trigger circuits 6 and 7. Numerals 10, 11, 12 and 13 designate transistors, 14 and 15 base resistors, 16 and 17 temperature compensating resistors for collector cutoff current $I_{CBO}$, 18 and 19 collector resistors of the transistors 10 and 12 respectively, 20 and 21 common emitter resistors, 22 and 23 level shifting diodes, 24 and 25 temperature compensating resistors for collector cutoff current $I_{CBO}$, 26 and 27 collector resistors of the transistors 11 and 13, 28 and 29 voltage characteristic compensating resistors connected respectively between the junction point of the emitters of the transistors 10 and 11 and a power supply 30 and the junction point of the emitters of the transistors 12 and 13 and the power supply 30. Numeral 31 designates an AND circuit for performing the AND operation on the outputs of the discrimination circuits 6 and 7, 32 and 33 diodes, 34 a level shifting Zener diode for decreasing the level of the outputs of the discrimination circuits 6 and 7. Numeral 35 designates a temperature compensating resistor for collector cutoff current $I_{CBO}$, 36 a transistor, 37 a collector resistor. Numeral 38 designates an indicator driving circuit comprising a level shifting diode 39, a temperature compensating resistor 40 for collector cutoff current $I_{CBO}$, a transistor 41 and a protective resistor against lamp rush current. Numeral 43 designates an indicator comprising a lamp mounted on an instrument panel installed at the front part of the driver's compartment in the vehicle.

Figure 3:
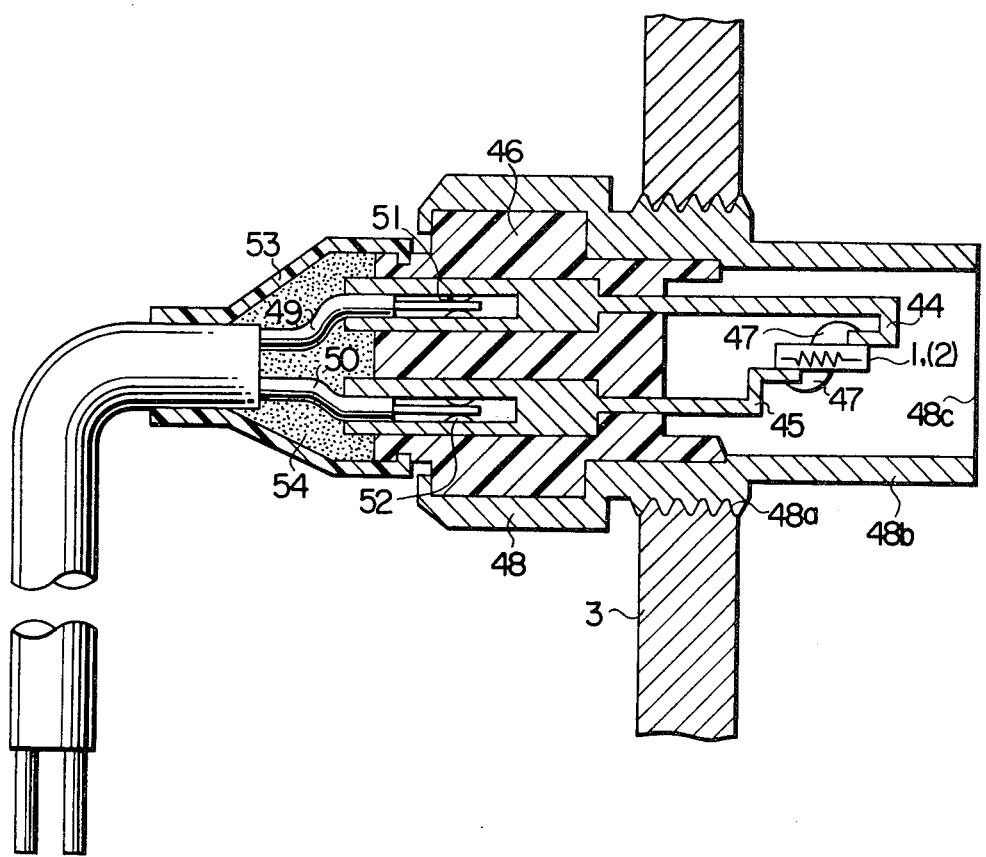
FIG. 3 is a sectional view of an exemplary mounting structure for explaining the manner in which the thermal variable resistance elements are mounted.

In FIG. 3 showing an exemplary structure for mounting the thermal variable resistance elements 1 and 2 on the liquid container 3, the thermal variable resistance element 1 or 2 is soldered to metallic (brass) supporting conductors 44 and 45 which are held in an insulating support 46 comprising a molded resin insulation. Numeral 47 designates welds between the thermal variable resistance element 1 or 2 and the supporting conductors 44 and 45. Numeral 48 designates an iron fixture caulked and fixedly mounted on the insulating support 46 and comprising a mounting threaded portion 48a that engages with an internal threaded portion on the side wall of the liquid container 3 (oil pan), and a cylindrical portion 48b enclosing the thermal variable resistance element 1 or 2. The cylindrical portion 48b is formed with an open forward end 48c to permit the engine oil in the liquid container 3 to go in and out of the cylindrical portion 48b freely and thereby to prevent the splash of the engine oil from depositing on the thermal variable resistance element 1 or 2. Numerals 49 and 50 designate lead wires having the ends thereof respectively attached to the supporting conductors 44 and 45 by soldering. Numerals 51 and 52 designate the soldered welds, 53 a rubber cover, 54 an impregnated resin material filled in the cover 53.

With the construction described above, the operation of the first embodiment is as follows. Each of the thermal variable resistance elements 1 and 2 comprising a posistor is normally energized by the power supply 30 to self-heat, and its radiation rate differs considerably depending on whether it is in the liquid or out of the liquid in the liquid container 3 and hence the resistance value of the element itself changes to vary its resistance value. Consequently, when the amount of the engine oil in the liquid container 3 is normal and both of the thermal variable resistance elements 1 and 2 are in the engine oil, they have a high radiation rate to decrease the temperatures thereof with resultant drop in their resistance values. Thus, the potentials at the junction points a and b in FIG. 1 rise so that the potentials at the input terminals c and d of the discrimination circuits 6 and 7 also rise to render the transistors 10 and 12 conductive. When this occurs, the transistors 11 and 13 are rendered nonconductive and the power supply voltage is applied to the Zener diode 34 through the diodes 32 and 33 to render the Zener diode 34 conductive. The conduction of the Zener diode 34 renders the transistor 36 conductive with the result that the collector potential of the transistor 36, i.e., the output potential of the AND circuit 31 becomes equal to the ground potential to cut off the transistor 41 in the indicator driving circuit 38. As a result, the indicator 43 is not operated thus indicating that the liquid level of the engine oil is normal.

On the other hand, when the amount of the engine oil decreases so that the level of the engine oil drops below the detecting liquid level, both of the thermal variable resistance elements 1 and 2 come out of the engine oil and hence the radiation rates of the elements 1 and 2 decrease with resultant rise in the temperatures of the elements 1 and 2 which increases their resistance values. As a result, the potentials at the output terminals a and b of the elements 1 and 2 decreases and hence the potentials at the input terminals c and d of the discrimination circuits 6 and 7 decrease to switch the transistors 10 and 12 to the nonconductive state. This renders the transistors 11 and 13 conductive and their collector potentials decrease to render the diodes 32 and 33 and the Zener diode 34 nonconductive. Consequently, the transistor 36 is rendered nonconductive and the power supply voltage is applied to its collector with the result that the base current flows through the diode 39 to the transistor 41 to render it conductive. When this occurs, the indicator 48 is operated to give an indication to the driver that the engine oil has decreased below a predetermined amount.

Next, the operation of the system when the body of a vehicle ascending or descending a slope or running on a curved road is inclined will be described. Firstly, when the vehicle body is inclined in the longitudinal direction so that the thermal variable resistance element 1, for example, is brought out of the liquid level of the engine oil, although the resultant increase in the resistance value of the transistor 11 of the discrimination circuit 6 conductive, the other thermal variable resistance element 2 remains below the level of the engine oil and hence the transistor 13 of the discrimination circuit 7 is retained in the nonconductive state. Consequently, the indicator 43 remains off and in this way the longitudinal inclination of the vehicle body is prevented from causing the system to operate erroneously. Secondly, when the vehicle body is inclined sideways, only one of the thermal variable resistance elements, e.g., the element 1 comes out of the liquid level of the engine oil and the other thermal variable resistance element 2 is remaining below the level of the engine oil. Thus, as in the previously mentioned case, the indicator 43 remains off and thus no misoperation takes place. In other words, in the system according to this invention, the thermal variable resistance elements 1 and 2 are arranged in opposite positions on the detecting level of a liquid in the liquid container 3, whereby the indicator 43 is actuated in accordance with the logical product of the outputs from the elements 1 and 2 to prevent the occurrence of any misoperation due to the inclination of the vehicle body.

Another important feature of the present invention is the construction of the discrimination circuits 6 and 7 which are identical with each other. The discrimination circuit 6 will now be described in greater detail. If the resistance values of the thermal variable resistance element 1 and the resistors 4, 14, 18, 20, 24, 26 and 28 are respectively represented as $R_x$, $r_4$, $r_{14}$, $r_{16}$, $r_{18}$, $r_{20}$, $r_{24}$, $r_{26}$ and $r_{28}$ and if the voltage of the power supply 30 is represented as E, then the two transition input voltages at a junction point e for the Schmitt trigger circuit constituting the discrimination circuit 6 are given by the following equations:

A. A transition input voltage $V_{\theta 1}$ for switching the transistor 10 from the conductive state to the nonconductive state is given as follows:

$$V_{\theta_1} \approx \frac{E \cdot r_{20}}{(r_{18}//r_{28}) + r_{20}} \qquad (1)$$

In the above equation (1), the resistance value $r_{14}$ of the resistor 14 is not included since it is extremely large.

B. A transition input voltage $V_{\theta_2}$ for switching the transistor 10 from the nonconductive state to the conductive state is given as follows:

$$V_{\theta_2} \approx \frac{E \cdot r_{20}}{(r_{18}//r_{28}//r_{26}) + r_{20}} \qquad (2)$$

On the other hand, the base-emitter voltage $V_{BE}$ of the transistor 10 is substantially equal to the forward voltage drop of the diode 8 and therefore they cancel each other. As a result, the transition input voltages at the junction point $a$ become equal to those at the junction point $e$ $$V_{a1} = \frac{E \cdot r_4}{R_{x1} + r_4} \approx V_{\theta_1} \qquad (3)$$

$$V_{a2} = \frac{E \cdot r_4}{R_{x2} + r_4} = V_{\theta_2} \qquad (4)$$

In the above equations (3) and (4), $R_{x1}$ and $R_{x2}$ represent respectively the resistance values of the thermal variable resistance element 1 at the two transition points of the Schmitt trigger circuit. In fact, the values of $r_{18}$ and $r_{26}$ are preselected sufficiently large as compared with $r_{28}$ and therefore the above equations (1) and (2) may be approximately rewritten as follows:

$$V_{\theta_1} \approx \frac{E \cdot r_{20}}{(r_{18}//r_{28}) + r_{20}} \approx \frac{E \cdot r_{20}}{r_{28} + r_{20}} \qquad (1)'$$

$$V_{\theta_2} \approx \frac{E \cdot r_{20}}{(r_{18}//r_{28}//r_{26}) + r_{20}} \approx \frac{E \cdot r_{20}}{r_{28}' + r_{20}} \qquad (2)'$$

where $r_{28} > r_{28}'$
we obtain from equations (1)' and (3)

$$\frac{r_{28}}{r_{20}} = \frac{r_{x1}}{r_4} \qquad (5)$$

we also obtain from equations (2)' and (4)

$$\frac{r_{28}'}{r_{20}} = \frac{R_{x2}}{r_4} \qquad (6)$$

As will be seen from the above equations (5) and (6), in the device according to the present invention the thermal variable resistance element 1 and the resistors 4, 28 and 20 constitute a bridge circuit so that the effects due to temperature and variation of the supply voltage can be minimized by the action of this bridge circuit. Further, the variation with temperature of the base-emitter voltage $V_{BE}$ of the transistor 10 itself can be cancelled by the forward voltage drop of the diode 8.

Furthermore, the hysteresis range of the Schmitt trigger circuit is obtained as follows from the above equations (5) and (6)

$$R_{x1} \sim R_{x2} = r_4 x \frac{(r_{28} \sim r_{28}')}{r_{20}}$$

Thus, its value may be selected depending on the values of the resistors 4, 20 and 28.

The embodiment described hereinbefore is a preferred exemplary embodiment of the present invention and therefore this invention is not intended to be limited to the details shown, since many modifications and changes may be made without departing from the spirit of the present invention. For example, the thermal variable resistance elements 1 and 2 may for example be thermistors having a negative temperature coefficient characteristic instead of posistors having a positive temperature coefficient characteristic, and the indicator 43 may for example be a buzzer instead of a lamp.

Figure 4:
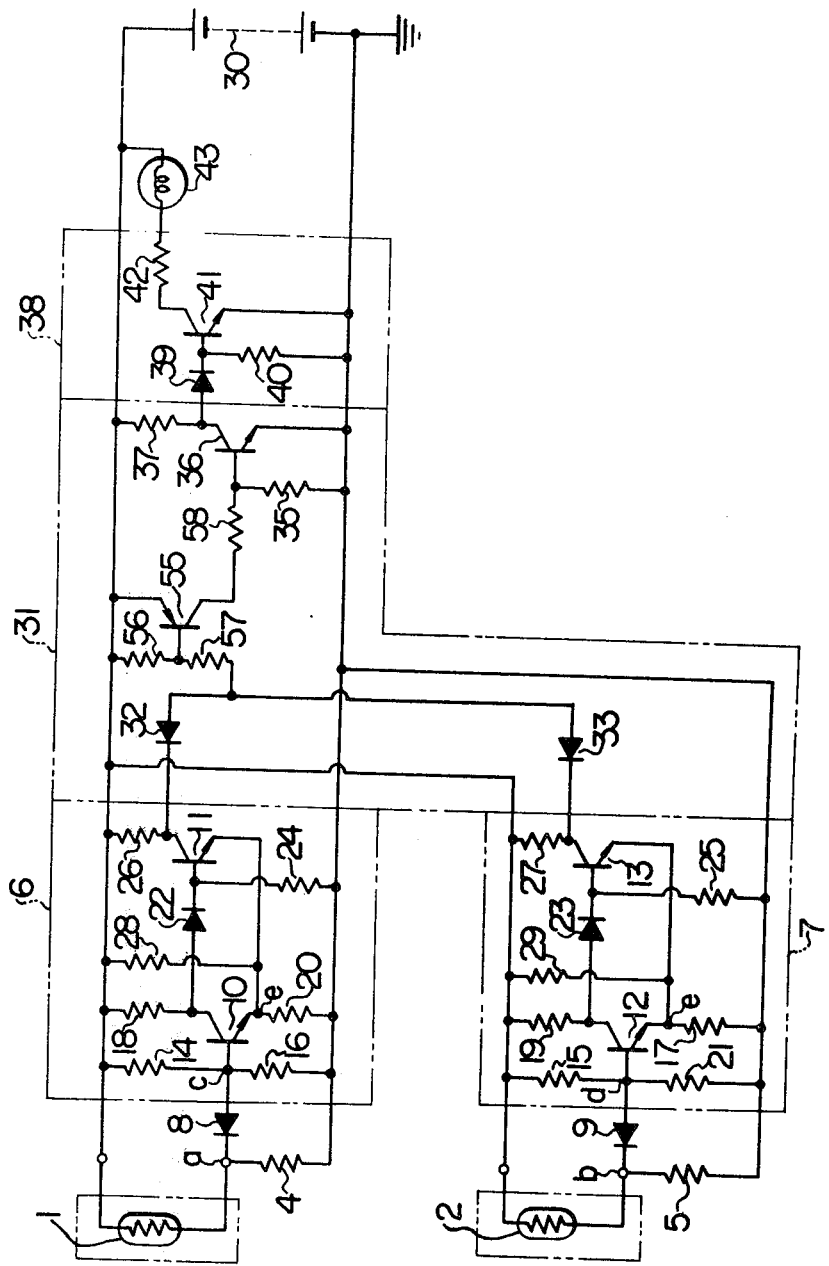
FIGS. 4 and 5 are wiring diagrams showing further embodiments of the system according to the present invention.

FIG. 4 illustrates another embodiment of the invention in which the thermal variable resistance elements 1 and 2 comprise thermistors having a negative temperature-coefficient characteristic. Also in the AND circuit 31, a PNP transistor 55 performs the required level shifting function instead of the Zener diode 34 in the embodiment of FIG. 1. Numerals 56, 57 and 58 designate the base biasing resistors and the collector resistor of the transistor 55. Excepting these component parts, this embodiment is identical with the first embodiment of FIG. 1.

Figure 5:
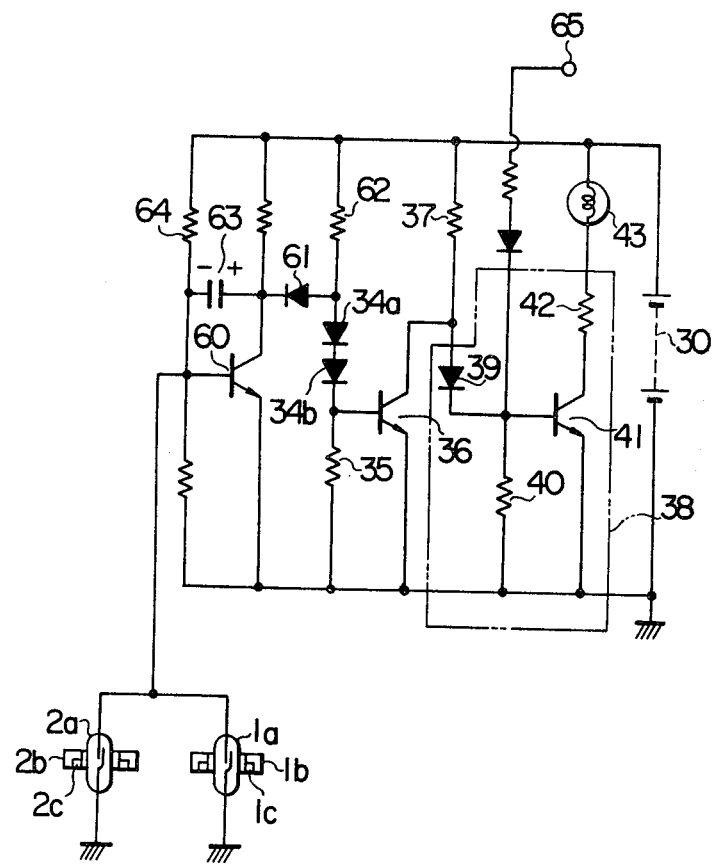

FIG. 5 illustrates still another embodiment of the present invention wherein instead of the thermal variable resistance elements 1 and 2 used in the first and second embodiments, reed switches 1a and 2a respectively actuated by magnet floats 1b and 2b are used. As with the thermal variable resistance elements 1 and 2, the reed switches 1a and 2a are arranged in opposite positions on the detecting liquid level of a liquid in the liquid container 3. In the normal conditions (where the liquid level is above the detecting liquid level), the reed switches 1a and 2a are respectively closed by the magnetic flux of the floats 1b and 2b. In other words, the uppermost positions of the floats 1b and 2b are limited by the associated stoppers which are not shown, so that the reed switches 1a and 2a are normally closed.

With the reed switches 1a and 2a being normally closed as mentioned above, a transistor 60 is rendered nonconductive and its collector potential substantially equals the power supply potential thus passing no current to a diode 61. Consequently, the current flowing through a resistor 62 flows through the base and the emitter of a transistor 36 by way of level shifting diodes 34a and 34b to render the transistor 36 conductive. As a result, a transistor 41 in an indicator driving circuit 38 is rendered nonconductive and hence an indicator 43 is not operated. During this time interval, a capacitor 63 is charged in the polarity shown.

Then, when the liquid level becomes lower than a detecting liquid level so that both of the reed switches 1a and 2a are opened, the transistor 60 is rendered conductive. In this case, however, the transistor 36 is not immediately rendered nonconductive. The reason is that for a time period of for example 3 seconds during which the capacitor 63 discharges its stored charge through a resistor 64, the collector potential of the transistor 60 does not drop to a level that renders the transistor 36 nonconductive. The purpose of the delay time provided by the capacitor 63 and the resistor 64 is to prevent the occurrence of misoperation that may be caused by a momentary change in the liquid level due to vibration of the vehicle body or the like. After the expiration of this delay time, the transistor 36 is rendered nonconductive so that the transistor 41 is rendered conductive to actuate the indicator 43. In FIG. 5, numeral 65 designates a terminal to which a positive is applied to check the presence of a fault in the indicator 43.

What we claim is:

1. A liquid level detecting and indicating system for a vehicle having a liquid container comprising a pair of liquid level detecting elements arranged spaced apart in opposite positions on a detecting level of a liquid in said liquid container and along a straight line inclined with respect to the direction of movement of said vehicle, circuit means for generating an output signal when each of said liquid level detecting elements generates a signal indicating that the level of said liquid in said liquid container has dropped below said detecting liquid level, and an indicator actuated by said output signal from said circuit means.

2. A system according to claim 1, wherein each of said liquid level detecting elements comprises a thermal variable resistance element whose resistance value varies with temperature.

3. A system according to claim 1, wherein each of said liquid level detecting elements comprises a reed switch opened and closed by a magnet float.

4. A system according to claim 2 further comprising fitting means for mounting each of said thermal variable resistance elements on the side wall of said liquid container, said fitting means including a cylindrical member enclosing said thermal variable resistance element.

5. A liquid level detecting and indicating system for a vehicle having a liquid container comprising a pair of thermal variable resistance elements arranged in opposite positions on a detecting level of a liquid in said liquid container, a discrimination circuit connected to each of said thermal variable resistance elements for discriminating the resistance level thereof, each said discrimination circuit comprising a Schmitt trigger circuit having a pair of transistors, an AND circuit for generating an output signal when each of said discrimination circuits generates an output signal, and an indicator actuated by said output signal from said AND circuit.

6. A system according to claim 5 further comprising a resistor connected in series with each of said thermal variable resistance elements, a diode for connecting the input terminal of each said Schmitt trigger circuit to the junction point of said thermal variable resistance element and said series resistance, a common emitter resistor for said pair of transistors in each said Schmitt trigger circuit, and a resistor connected in series with each of said common emitter resistors.

7. A liquid level detecting and indicating system for a vehicle having a liquid container comprising:

a pair of reed switches arranged with a space in opposite positions on a detecting level of a liquid in said liquid container for detecting that the level of the liquid in said liquid container is dropped below said detecting liquid level, each of said reed switches adapted to be opened and closed by a magnet float, a Miller integrator circuit connected to said pair of reed switches for generating an output signal when said Miller integrator circuit detects that both of said pair of reed switches keep to operate over a predetermined period of time, a switching circuit connected to said Miller integrator circuit and actuated to generate another output signal in response to said output signal from said Miller integrator circuit, and an indicator connected to said switching circuit and actuated by said another output signal from said switching circuit for indicating that the level of the liquid in said liquid container is dropped below said detecting liquid level.

* * * * *